US010401814B2

United States Patent
Vucic et al.

(10) Patent No.: US 10,401,814 B2
(45) Date of Patent: *Sep. 3, 2019

(54) METHOD FOR CONFIGURING A SWITCHED-MODE POWER SUPPLY

(71) Applicant: Siemens Aktiengesellschaft, Munich (DE)

(72) Inventors: Miroslav Vucic, Vienna (AT); Dieter Hublitz, Niederwerrn (DE); Robert Schedlberger, Bad Zell (AT)

(73) Assignee: Siemens Aktiengesellschaft, Munich (DE)

( * ) Notice: Subject to any disclaimer, the term of this patent is extended or adjusted under 35 U.S.C. 154(b) by 318 days.

This patent is subject to a terminal disclaimer.

(21) Appl. No.: 15/320,248

(22) PCT Filed: Jun. 24, 2015

(86) PCT No.: PCT/EP2015/064243
§ 371 (c)(1),
(2) Date: Dec. 19, 2016

(87) PCT Pub. No.: WO2015/197684
PCT Pub. Date: Dec. 30, 2015

(65) Prior Publication Data
US 2018/0210408 A1    Jul. 26, 2018

(30) Foreign Application Priority Data
Jun. 25, 2014    (EP) ..................... 14173889

(51) Int. Cl.
*G05B 19/042* (2006.01)
*H02J 1/00* (2006.01)
(Continued)

(52) U.S. Cl.
CPC .............. *G05B 19/042* (2013.01); *H02J 1/00* (2013.01); *H02J 4/00* (2013.01); *H02J 13/00* (2013.01);
(Continued)

(58) Field of Classification Search
CPC ........ G05B 19/042; G05B 2219/25202; G05B 2219/25061; H02J 13/00; H02J 1/00; H02J 4/00; H02J 2001/008; Y02P 80/14
(Continued)

(56) References Cited

U.S. PATENT DOCUMENTS 7,181,517 B1 *    2/2007    Iavergne ................. H04L 41/22
700/286

FOREIGN PATENT DOCUMENTS

CN    201898445 U    7/2011
CN    103390929        11/2013
(Continued)

*Primary Examiner* — Fernando Hidalgo
(74) *Attorney, Agent, or Firm* — Cozen O'Connor

(57) ABSTRACT

A method for configuring a switched-mode power supply with multiple output channels, where the switched-mode power supply includes at least one operating element for each output channel, where the operating element is used to manually adjust an operating parameter for the corresponding output channel, the switched-mode power supply also includes an interface for performing a remote configuration, where each manually adjusted operating parameter is output to a remote configuring unit via the interface, and each manually adjusted operating parameter is transferred into a switched-mode power supply configuration that is set via the configuring unit such that, in a manual mode, adjusted operating parameters are transferred into the remote configuration and are used in a remote mode upon restarting the switched-mode power supply.

10 Claims, 2 Drawing Sheets

(51) Int. Cl.
*H02J 4/00* (2006.01)
*H02J 13/00* (2006.01)

(52) U.S. Cl.
CPC .............. *G05B 2219/25061* (2013.01); *G05B 2219/25202* (2013.01); *H02J 2001/008* (2013.01); *Y02P 80/14* (2015.11)

(58) Field of Classification Search
USPC ........................................................ 700/297
See application file for complete search history.

(56) References Cited

FOREIGN PATENT DOCUMENTS

| | | |
|---|---|---|
| CN | 104113129 | 10/2014 |
| DE | 10 2007 026 678 A1 | 12/2008 |
| DE | 10 2009 028 655 A1 | 2/2011 |
| DE | 10 2012 102 518 A1 | 9/2013 |

\* cited by examiner

METHOD FOR CONFIGURING A SWITCHED-MODE POWER SUPPLY

CROSS-REFERENCE TO RELATED APPLICATIONS

This is a U.S. national stage of application No. PCT/EP2015/064243 filed 24 Jun. 2015. Priority is claimed on European Application No. 14173889 filed 25 Jun. 2014, the content of which is incorporated herein by reference in its entirety.

BACKGROUND OF THE INVENTION

1. Field of the Invention

The invention relates to a switched mode power supply and method for configuring the switched mode power supply having several output channels, where the switched mode power supply incorporates at least one operating element for each output channel, by which an operating parameter can be adjusted/set manually for the associated output channel.

2. Description of the Related Art

Switched mode power supplies with several output channels are used to supply different consumers simultaneously. Often, each output channel can then be adjusted separately via a potentiometer or a DIP switch.

In the case of industrial applications in the automation field, special demands are placed on switched mode power supplies. For example, a flexible configuration is required, in order to ensure a reliable supply of power even after restructuring of an industrial facility.

SUMMARY OF THE INVENTION

An objective of the present invention is therefore to provide an improved method for configuring a switched mode power supply for use in industrial facilities.

This and other objects and advantages are achieved in accordance with the invention by a method and a switched mode power supply, wherein the switched mode power supply incorporates an interface for the purpose of remote configuration, where each of the manually adjusted operating parameters is output via an interface to a remote configuration unit, and where the manually adjusted operating parameter concerned is copied into a configuration of the switched mode power supply determined by the configuration unit. Operating parameters that are set in a manual mode are copied into the remote configuration, and applied the next time the switched mode power supply is started in a remote mode.

The method in accordance with the invention also creates the possibility of using manually set operating parameters in a configuration software package, for example, in order to carry out analyses or to make changes to the configuration. Here, the switched mode power supply incorporates a diagnostic unit, in order to make the manually adjusted operating parameters available. In particular, when several switched mode power supplies are being remotely configured by a central configuration unit, the method is advantageous because all the manually input operating parameters are immediately available in the configuration unit, at the press of a button.

In one advantageous embodiment of the invention, the interface is in the form of a Web interface, where the remote configuration unit incorporates a Web browser, where the relevant operating parameter is displayed in an output mask of the Web browser, and where the operating parameter concerned is copied into a configuration of the switched mode power supply via a Web browser control element. The configuration unit is then a computer, on which a Web browser is installed and which is linked to the switched mode power supply via a suitable communications network. Apart from the Web browser, no further software is then required to perform remote configuration.

It is of advantage if an output voltage is set as an operating parameter for each output channel. The switched mode power supply can then be flexibly matched to different requirements within an industrial facility.

It is a further of advantage if a current threshold value is set, as an operating parameter for each output channel, such that when the threshold value is reached the output channel concerned enters a current limitation mode. The switched mode power supply is then suitable for bridging over short overloads. For example, during a switch-on operation, the output current will be limited for the time until connected capacitances have been charged up. In this case, it is advantageous if a limit duration is set as an operating parameter for each output channel and if, after the limit duration has expired, the associated output channel is switched off to avoid damage to a facility when a fault occurs. For example, in the event of a short circuit a switch-off will take place after the limit duration has expired.

The switched mode power supply in accordance with the invention incorporates for each output channel at least one operating element, by which an operating parameter can be manually set for the associated output channel, where the switched mode power supply incorporates a diagnostic unit for presenting the operating parameter that has been set and an interface for the purpose of remote configuration, and is equipped to implement one of the methods cited. It is then unnecessary to detect via an external measurement device, the operating parameters which have been set. Here, it is convenient if the switched mode power supply incorporates a real-time Ethernet controller, which is connected to a controller of the switched mode power supply and is equipped as a Web server. Configuration changes then take immediate effect, because the data transmission between the switched mode power supply and the remote configuration unit occur in real time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of examples, making reference to the attached figures, in which.

DETAILED DESCRIPTION OF THE EXEMPLARY EMBODIMENTS

Figure 1:
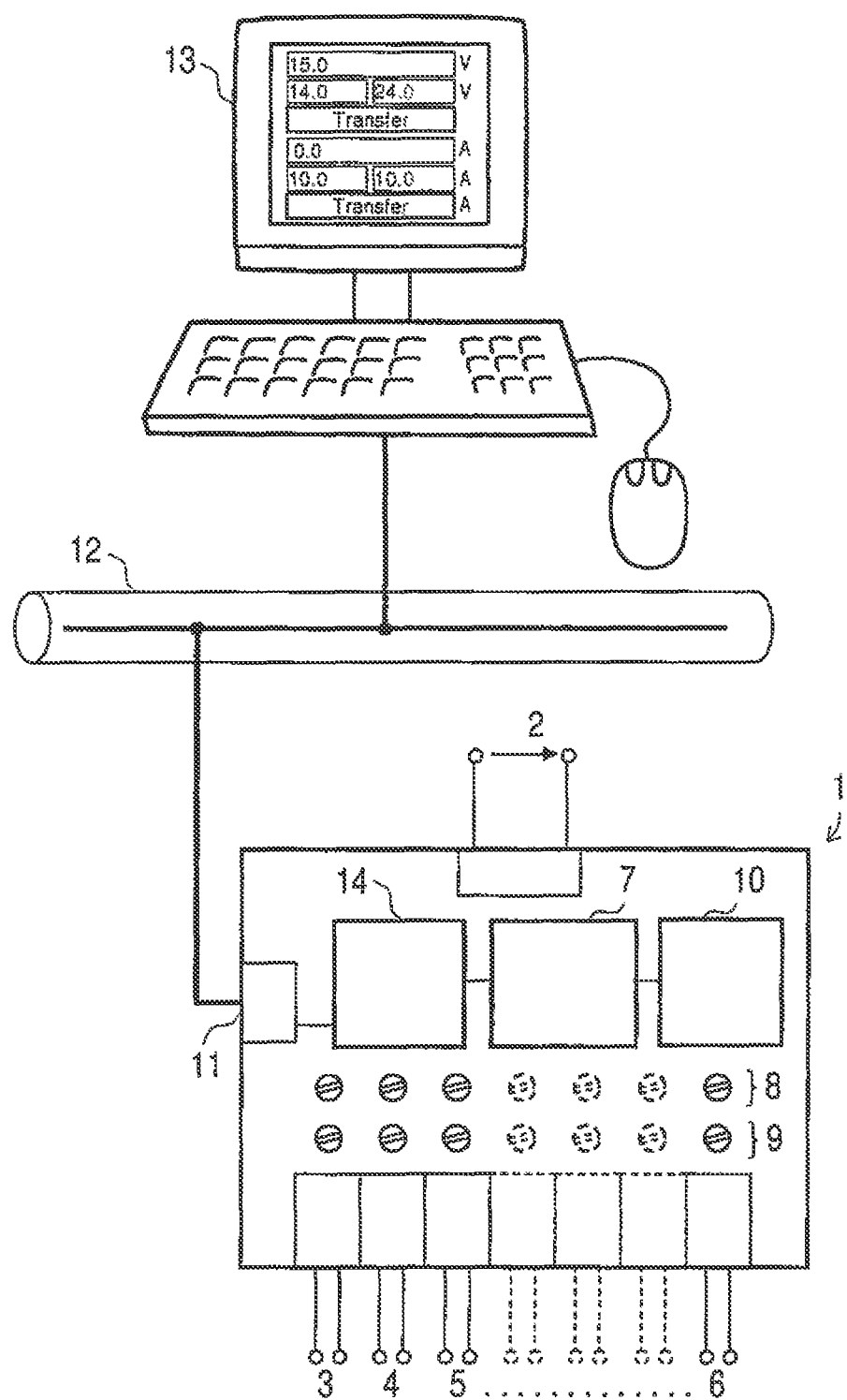
FIG. 1 is a schematic block diagram of a switched mode power supply in accordance with the invention.

FIG. 1 shows a switched mode power supply 1 which is connected to an input voltage 2 and has several output channels 3, 4, 5, 6. A relevant output voltage is present at each of the output channels 3, 4, 5, 6.

Each output channel 3, 4, 5, 6 is actuated by a controller 7. The power circuit of the switched mode power supply 1 (which is not shown in detail) consists, for example, of a rectifier on the input side, an intermediate circuit and several converters. For example, several resonance converters are connected to the intermediate circuit, where their power circuits are actuated by the controller 7.

An intermediate circuit voltage is converted, by a clocked switching on and off of the power circuit, to an output voltage that is applied at the relevant output channel. For this purpose, the controller 7 is equipped with appropriate regulatory algorithms. Here, the individual output voltages can either be different or of the same magnitude. In addition, there is the possibility to connect two or more channels 3, 4, 5, 6 in parallel, in order to provide a higher output power.

The switched mode power supply has a manual mode and a remote mode. In order to set the desired output voltage for each output channel 3, 4, 5, 6 in manual mode, suitable operating elements 8, 9 are present on the device itself. In the simplest case, this is in each case an adjustment screw on a potentiometer, or a DIP switch.

For example, using a first operating element 8, the appropriate output voltage is set for each of the output channels 3, 4, 5, 6. Here, the relevant operating element 8 is kept activated until the desired output voltage is present at the associated output.

Using further operating elements 9, a current limit can be set in each case. In the simplest case, for each output channel 3, 4, 5, 6, a current threshold value is set at which, when it is reached, current limitation becomes active. Further setting options relate to a duration of the limitation or a two-stage limitation. For each of the output channels 3, 4, 5, 6, several operating elements 9 are then provided. A two-stage limitation provides that when a first current limit value is reached it is possible to operate in the overload region for a prescribed length of time, for example, in order to charge capacitances on the output side. Only when a second current limit value is reached is the current then limited, where once again a maximum duration for the limitation is set.

In order to be able to "read out" the operating parameters that are set, the switched mode power supply 1 incorporates a diagnostic unit 10, which is for example linked to the controller 7. For each output channel 3, 4, 5, 6 this detects, for example, the instantaneous actual value and the set value of the output voltage, the maximum output current together with the instantaneous actual value, and threshold value of the output current above which current limitation becomes active. For this purpose, the diagnostic unit 10 incorporates suitable measurement elements, such as current converters or shunt resistors.

In this way, operating the switched mode power supply 1 is significantly simplified, because settings that are made manually no longer have to be measured externally which, in particular for current limits, is difficult.

In accordance with the invention, the switched mode power supply 1 incorporates an interface 11 for the purpose of remote configuration, in order to be able to make settings for the remote mode. Here, this can, for example, be a Web interface, by which the switched mode power supply 1 is linked via a communications network 12 to a remote configuration unit 13. In this way, it is possible to centrally configure several switched mode power supplies 1 within an industrial facility.

In this case, the switched mode power supply 1 incorporates, for example, a real-time Ethernet controller 14 which is linked on one side to the controller 7, and on the other side to the interface 11. The real-time Ethernet controller 14 is equipped as a Web server. This ensures that it is possible to make the settings to the output voltages, and the current values or time durations, as applicable, in real time via the communications network 12 via the configuration unit 13. The configuration unit 13 is, for example, a computer on which is installed a Web browser. Here, it is important that manual changes made via the operating elements 8, 9 are also shown in real time in a window of the Web browser.

Visible on the Web browser there is, for example, a mask with several input fields and control elements. For each output channel 3, 4, 5, 6, the instantaneous output voltage is shown. Specified in two further fields are a manual setting for the output voltage and a value set for it via remote configuration. Using a browser control element "Transfer", the value which has been set manually is copied in as the set value for the remote mode.

The same provision is made for the current in the output channel 3, 4, 5, 6 concerned. Here, the instantaneous output current (actual value) is shown in a first field. Specified in two further fields are trigger threshold values for the output current, one which has been set manually and one set via remote configuration. Once again, the manually set threshold value is copied across by means of a browser control element "Transfer".

Optionally, the operating status of the output channel 3, 4, 5, 6 concerned, or of the switched mode power supply 1, as applicable, will be shown in the Web browser, for example whether a particular output channel is switched in.

In this way, time-consuming manual input of the setting values is eliminated, so that commissioning or appropriate adjustment of the switched mode power supply 1 can be rapidly performed.

The communications network 12 is, for example, an Ethernet or a PROFINET. The PROFINET uses TCP/IP and IT standards, has real-time Ethernet capability and permits the integration of numerous field bus systems.

A considerable advantage of the invention lies in the fact that it is possible to make complex settings to the multi-channel power supply 1 from a central location, in a simple way and in real time, where operating parameters that previously had to be manually set are immediately available centrally. The settings of a switched mode power supply 1 that have been made manually can, in this way, be copied across with no intermediate steps to other switched mode power supplies 1 that are connected to the communications network 12. This makes the commissioning of an industrial facility with several switched mode power supplies 1 substantially easier.

Figure 2:
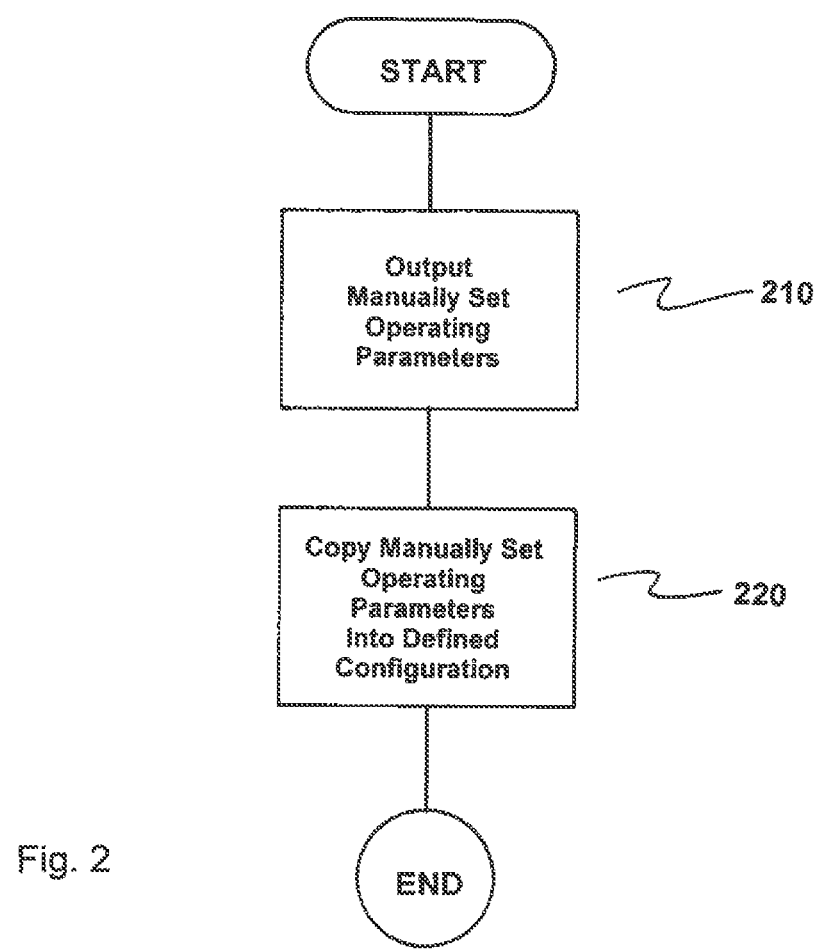
FIG. 2 is a flowchart of the method in accordance with the invention.

FIG. 2 is a flowchart of a method for configuring a switched mode power supply (1) having several output channels (3, 4, 5, 6), where the switched mode power supply (1) incorporates for each output channel (3, 4, 5, 6) at least one operating element (8, 9) via which an operating parameter is manually set for an associated output channel (3, 4, 5, 6), and the switched mode power supply (1) incorporates an interface (11) for performing remote configuration. The method comprises outputting each of the operating parameters which has been set manually to a remote configuration unit (13) via an interface (11), as indicated in step 210. Next, each of the operating parameters which has been set manually are now copied into a configuration for the switched mode power supply (1) defined via a configuration unit (13), as indicated in step 220.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring a switched mode power supply having several output channels, the switched mode power supply incorporating for each output channel at least one operating element via which an operating parameter is manually set for an associated output channel, and the switched mode power supply incorporating an interface for performing remote configuration, the method comprising:
outputting each of the operating parameters which has been set manually to a remote configuration unit via the interface incorporated into the switch mode power supply for performing the remote configuration; and
copying each of the operating parameters which has been set manually into a configuration for the switched mode power supply defined via a configuration unit within the remote configuration unit and applying the configuration during a subsequent start-up of the switched mode power supply.

2. The method as claimed in claim 1, wherein the interface comprises a Web interface;
wherein the remote configuration unit incorporates a Web browser;
wherein a relevant operating parameter is shown in an output mask of the Web browser; and
wherein the relevant operating parameter is copied into a configuration for the switched mode power supply via a Web browser control element.

3. The method as claimed in claim 1, wherein an output voltage is set as an operating parameter for each output channel.

4. The method as claimed in claim 2, wherein an output voltage is set as an operating parameter for each output channel.

5. The method as claimed in claim 1, wherein a current threshold value is set at which as an operating parameter for each output channel, at which when said current threshold value is reached, a relevant output channel concerned swaps into a current limiting mode.

6. The method as claimed in claim 2, wherein a current threshold value is set at which as an operating parameter for each output channel, at which when said current threshold value is reached, the relevant output channel concerned swaps into a current limiting mode.

7. The method as claimed in claim 3, wherein a current threshold value is set at which as an operating parameter for each output channel, at which when said current threshold value is reached, a relevant output channel concerned swaps into a current limiting mode.

8. The method as claimed in claim 5, wherein a limitation duration is set as an operating parameter for each output channel; and
wherein the associated output channel is switched off when a relevant limitation duration has expired.

9. A switched mode power supply comprising:
a plurality of output channels;
at least one operating element via which an operating parameter is set manually for an associated output channel for each output channel of the plurality of output channels;
a diagnostic unit for displaying the operating parameter which has been set manually; and
an interface for performing remote configurations;
wherein the switched mode power supply is configured to:
output each of the operating parameters which has been set manually to a remote configuration unit via the interface for performing the remote configurations, and
copy each of the operating parameters which has been set manually into a configuration for the switched mode power supply defined via a configuration unit within the remote configuration unit and apply the configuration during a subsequent start-up of the switched mode power supply.

10. The switched mode power supply as claimed in claim 9, wherein the switched mode power supply includes a real-time Ethernet controller connected to a controller of the switched mode power supply and is equipped as a Web server.

* * * * *